Aug. 21, 1945.   H. W. HUBBARD   2,383,314
SOLDERING JIG
Filed July 30, 1943   2 Sheets-Sheet 1

INVENTOR
HOWARD W. HUBBARD
BY Harold L. Gammons
AGENT

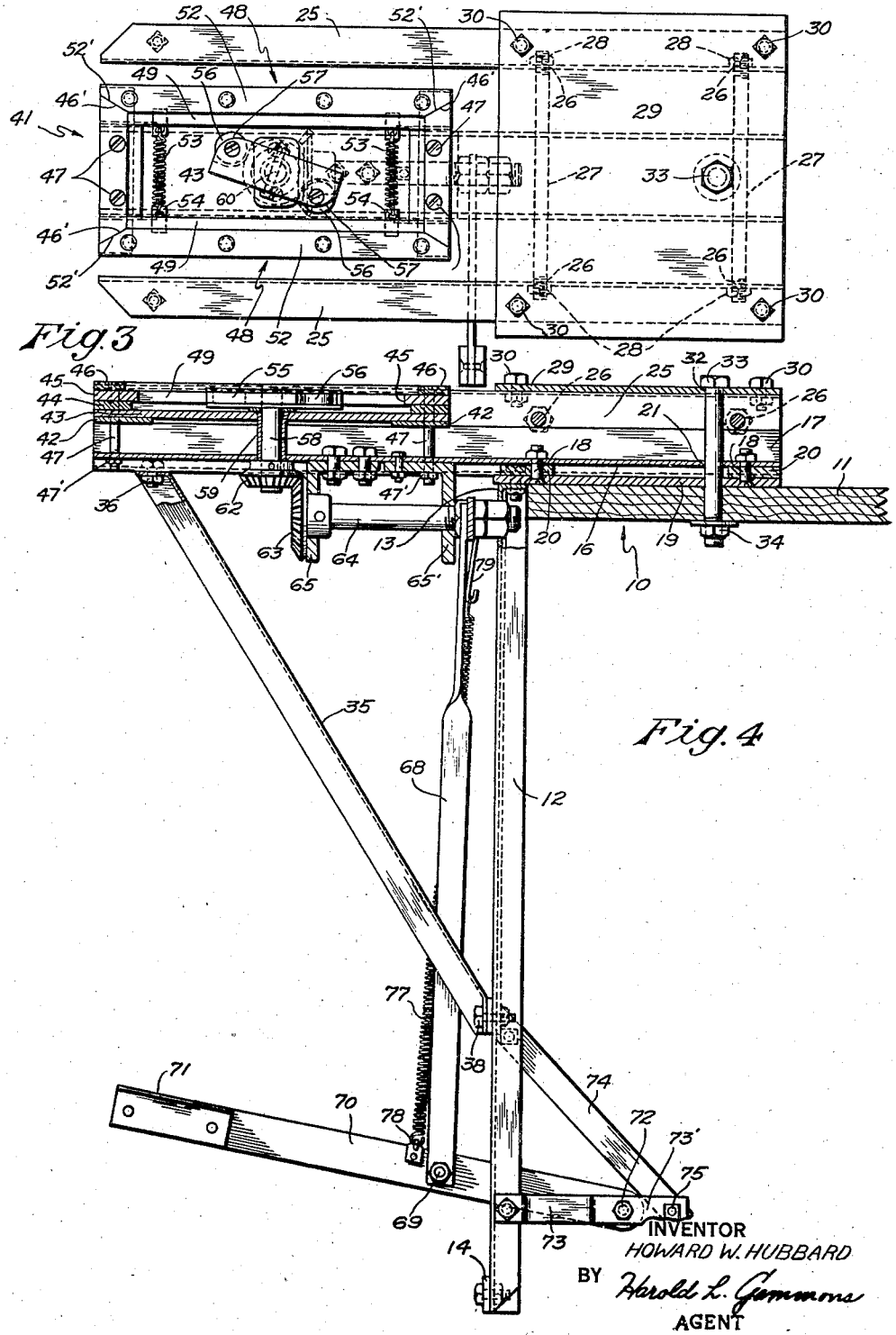

Patented Aug. 21, 1945

2,383,314

UNITED STATES PATENT OFFICE 2,383,314

SOLDERING JIG

Howard W. Hubbard, Salt Lake City, Utah, assignor to Remington Arms Company, Inc., Bridgeport, Conn., a corporation of Delaware Application July 30, 1943, Serial No. 496,712

5 Claims. (Cl. 113—100)

The invention relates in general to apparatus for holding a plurality of parts in properly assembled relationship while fastening the assembled parts together, and, in particular, to a jig for fastening ends onto box bodies.

In accordance with government specifications, ammunition for small arms is packed for shipment and storage in wooden packing boxes having water tight terneplate liners. One method of making these metal liners is to form the sides and bottoms of the box by making two right angle bends in a flat sheet of metal so as to construct an open end trough such as indicated at 6 in Fig. 1. Suitable flanges 7 are bent over on the open ends of this trough and are adapted to overlap suitable end pieces 8 which are to be soldered in place to form a substantially rectangular metal box having one open side. After the metal box or liner has been placed in a wooden packing box and filled with packaged rounds of ammunition, a metal cover, not shown, is then soldered over the open side of the metal box, suitable flanges 9 being provided on the sides and end pieces 8 for this purpose, thereby making an air and water tight container. A suitable cover is then secured on the wooden packing box. The present invention relates to means for forming the terneplate liners for these wooden packing boxes.

The object of the invention is to provide an improved jig to facilitate the positioning of parts to be fixedly united by a welded or soldered seam. A further object is to provide means quickly and easily operable to firmly hold several parts while they are being soldered together. A still further object is to provide a soldering jig for holding the end pieces and the rectangular metallic body of boxes, such as used as liners for ammunition cases, in properly assembled relationship to facilitate the application of solder to the seams in an economical, leak proof and rapid manner.

The foregoing and all other objects and advantages of the invention will become more apparent during the course of the following detailed description of the accompanying drawings in which:

Fig. 3 is a plan view of the soldering jig of Fig. 1.

Fig. 4 is a side elevation partly in section of the soldering jig.

Figures 1, 2, 5:
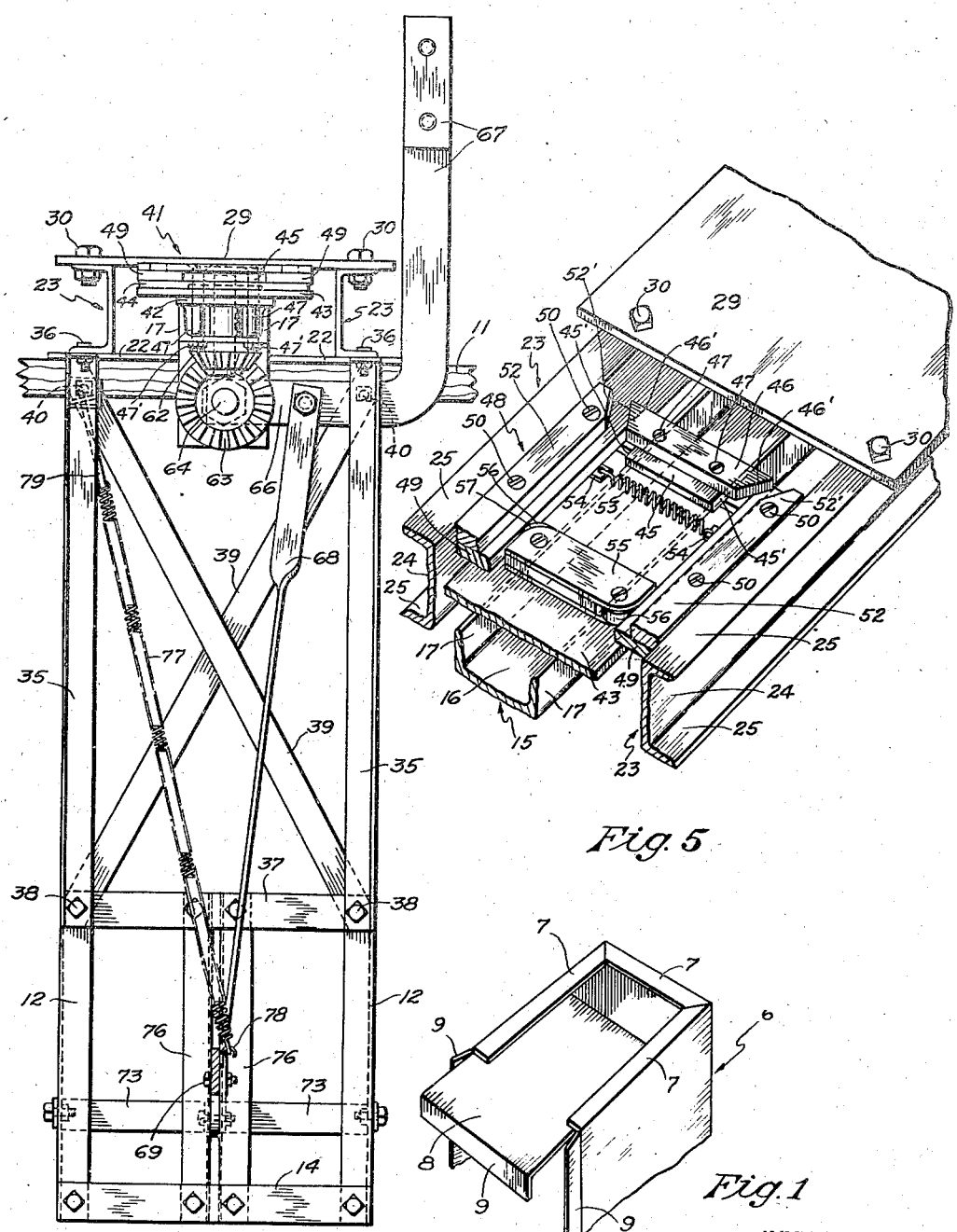
Fig. 1 is a fragmentary perspective view of the type of terneplate liner boxes adapted to be soldered together using the jig of this invention.
Fig. 2 is a front elevation of the improved soldering jig of this invention.
Fig. 5 is an enlarged fragmentary perspective view of the box supporting means and gripping members of the soldering jig.

One exemplary embodiment of the soldering jig is shown in the drawings and comprises a base indicated generally at 10, which may be the top of a work bench or table 11 having a pair of vertical legs 12 bolted at their upper ends to the forward edge 13 of the bench and braced at the lower ends by a crosspiece 14.

The frame of the soldering jig is adapted to be bolted or otherwise secured to the base so as to overhang the forward edge 13 thereof, and comprises a channel member 15, see Figs. 4 and 5, having a bottom 16 and spaced parallel upstanding flanges 17. A pair of vertically drilled holes are provided in the rear end of the channel bottom 16 for a pair of bolts 18 which are adapted to secure a metal wear plate 19 to the underside of the channel bottom 16 for engagement with the top of the bench 11, the wear plate 19 being spaced from the underside of the channel 15 by suitable spacer blocks 20. A smooth bored hole 21 is provided in the bottom 16 of the channel 15 for the purpose hereinafter described. The outer edges of the wear plate 19 extend laterally, see Fig. 2, beyond the upstanding flanges 17 of the channel 15 so as to provide steps 22 adapted to support the rear ends of a pair of channel members 23 hereinafter termed irons. The latter comprise web portions 24 and flanges 25 and are arranged on the steps 22 with the web portions 24 in substantially vertical, spaced parallel relationship and the flanges 25 of the channels facing outwardly as shown in Figs. 2 and 5. A pair of longitudinally spaced holes 26 are drilled horizontally in the web portions 24 of each iron adjacent its rear end, the holes 26 in the web of one iron being opposite to those in the web of the second iron. A rod 27 is shown extending through each pair of oppositely disposed holes 26 of the respective webs 24 each rod spanning the channel member 15, as shown in Fig. 3, and being secured in the holes 26 by nuts 28 threaded on its outer ends. The drilled holes 26 of the webs 25 are so disposed relative to the channel 15 that each rod 27 rests on the upper edges of the upstanding flanges 17 of the channel, see Fig. 4. A rectangular cover plate 29 is shown bolted at four points 30 on the top of the upper flanges 25 of the irons 23. A hole 32 is drilled vertically through the cover plate 29 in axial alignment with the drilled hole 21 of the channel member 15. A headed bolt 33 projects through these axially aligned holes and is secured to the table or bench 11 by a nut 34 threaded on the end of the bolt 33 on the underside of the bench. Thus, by tightening up the single nut 34, the lower flanges 25 of the irons 23 will be drawn down securely on the steps 22 of the wear plate 19 while the transversely extending rods 27 of the irons engage the upper edges of the flanges of the channel 15 so as to hold the rear end of the channel 15 and the wear plate 19 firmly down on the top of the bench 11.

The forward overhanging end of each iron 23 is supported from beneath by an angle iron brace 35, the upper end of each brace being bolted as at 36 to the lower flange 25 of its respective iron. The lower end of each brace is bolted to the ends of a horizontal cross brace 37 which is connected at its opposite ends by bolts 38 to the two vertical legs 12 of the brace. The bolts 38 also connect the lower ends of two diagonal braces 39 to the legs 12, the upper ends of the diagonal braces 39 being suitably bolted as at 40 to the upper ends of the legs 12.

Arranged on the portion of the channel 15 which overhangs the edge 13 of the bench 11 and between the spaced parallel irons 23 is suitable means, indicated generally at 41 in Figs. 2 and 3, for supporting the box body and end pieces in assembled relationship while applying solder to the seams thereof.

Referring to Fig. 4, the supporting means comprises a pair of substantially rectangular flat plates 42 mounted on the edges of the upstanding flanges 17 of the channel 15, each plate being located at the opposite ends of the overhanging portion of the channel and disposed transversely to its longitudinal axis. Supported on these transverse plates 42 is a substantially rectangular plate or table 43 which, as shown in Fig. 2, is considerably wider than the channel 15 and the transverse plates 42 and extends from the forward transverse plate 42 rearwardly across the rearward transverse plate 42. Arranged across each end of the table 43 and supported on top thereof is a substantially rectangular relatively narrow flat plate 44 substantially equal to the width of the table 43. The upper surface of each plate 44 is nicely finished to form a smooth flat bearing surface, the plates being hereinafter referred to as guide plates or guide members. Supported on each guide plate 44 is a substantially rectangular spacer plate 45, see Figs. 4 and 5, which is considerably narrower than the table 43 or guide members 44 but somewhat longer than the latter so as to provide spaced parallel edges or shoulders 45' which extend from opposite ends of the table 43 inwardly parallel to the longitudinal axis thereof. Mounted on the top of each spacer plate 45 is a transversely arranged limit plate 46 which is somewhat narrower than the table 43 but wider than the respective spacer plate 45 and provided with bevelled ends 46'. The bevelled ends 46' of each limit plate 46 thus overhang the shoulders 45' of the respective spacer plates 45 and, as shown, are spaced from the upper surface of the respective guide plates 44 by an amount equal to the vertical height of the shoulders 45'.

Suitable means are provided adjacent opposite ends of the table for securely fastening these superposed transversely disposed plates to the channel 15 and comprises two pairs of bolts 47, each pair of bolts being adapted to project down through axially aligned pairs of holes drilled vertically in the respective limit plate 46, spacer plate 45, guide plate 44, table 43, and transverse plate 42. The lower ends of the bolts 47 extend through suitable holes in the bottom 16 of the channel 15 and are secured to the channel by nuts 47' threaded on the ends of the bolts on the underside of the channel.

All the elements of the box body and end piece supporting means 41 thus far described are secured to the channel 15 in fixed relationship to the irons 23. In addition to these fixed members, the supporting means 41 also comprises a pair of movable gripping bars indicated generally at 48 in Figs. 3 and 5, each comprising relatively long narrow substantially rectangular members 49 arranged parallel to the longitudinal axis of the channel 15, each member 49 being supported at its opposite ends to slide laterally on the outer ends respectively of the transverse guide plates 44. The undersides of the overhanging ends 46' of each limit plate 46 are adapted to slidingly engage the upper surface of the adjacent end of each member 49. Thus the outer ends of the guide plates 44 and limit plates 46 constitute vertically spaced elements for guiding the members 49 which, as hereinafter described, are adapted to be moved laterally into gripping engagement with the vertical webs 24 of the irons 23. Fastened to the upper surface of each member 49 by suitable screws 50 is a strip 52 which is narrower than its respective member 49, the outer edge of each strip 52 extending longitudinally of and flush with the outer edge of its respective member 49. The opposite ends of each strip 52 are bevelled, as shown at 52', corresponding to the adjacent bevelled ends 46' of the limit plate 46. The upper surfaces of the strips 52 and the limit plates 46 lie in the same horizontal plane and define a substantially rectangular frame for supporting the parts of the box in assembled relationship. Referring to Fig. 5, it will be seen that, when the gripping bars 48 are moved laterally into engagement with the irons 23, the bevelled ends 52' and 46' of the strips 52 and limit plates 46 respectively are separated, whereas when the bars 48 are in their normal closed position, see Fig. 3, the bevelled edges 52' thereof are in engagement with the bevelled edges 46' of the limit plates, the edges 46' constituting shoulders to limit the inward movement of the bars 48.

The latter are constantly urged to return from their displaced position to their normal closed position by means of a pair of coil springs 53, each spring extending transversely across one end of the table 43 and being secured at its opposite ends in apertured tongues 54. As shown, one such tongue is welded or otherwise fastened on the underside of each movable member 49 at opposite ends thereof.

Suitable means are provided for positively moving the bars 48 outwardly or laterally in spaced parallel relationship and comprises a manually rotatable spreader member or arm 55 embodying a pair of disks or rollers 56 pivotally mounted on vertical axes in horizontal slots at diagonally opposite corners 57 of the arm, the periphery of each roller 56 being adapted to extend slightly beyond the rounded edge of each respective corner 57. The rollers are suitably spaced apart on the arm 55 so that when the latter is pivoted from its normal inoperative position, shown in Fig. 3, to its operative position, shown in Fig. 5, the gripping bars 48 will be engaged by the rollers and displaced laterally so that their outer sides will be moved substantially into engagement with the web portions 24 of the irons 23.

The spreader arm 55 is adapted to be rotated by manually or pedal operated means comprising a shaft 58 rotatably mounted in a sleeve bearing 59, which is supported vertically in suitable axially aligned apertures in the bottom 16 of the channel 15 and in the table 43. The spreader arm 55 is suitably fastened to the upper end of the shaft 58 by means of a transverse key, such as the bolt 60. A bevel gear 62 is keyed on the lower end of the shaft 58 and is adapted to mesh with a second bevel gear 63 which is keyed to one end of a horizontal shaft 64, the latter being rotatably supported on the underside of the channel 15 in suitable bearings of a pair of L-shaped brackets 65 and 65′ which are bolted to the underside of the channel 15. Connected on the opposite threaded end of the shaft 64 by suitable lock nuts is a laterally extending crank arm 66 bent at substantially right angles at its outer end, see Fig. 2, to provide a vertically extending handle 67. Suitably fastened to the crank arm 66, intermediate its right angle bend and its point of connection with the shaft 64, is a connecting link 68, the lower end of which is pivotally connected as at 69 to a pedal operated lever 70, which, as shown in Fig. 4, is provided at its forward end with a pedal 71 and is pivoted at its rear end 72 between two brackets 73. To this purpose, the forward end of each bracket 73 is bolted to a leg 12 of the frame, while the rear portion of each bracket is bent inwardly so that the rear ends 73′ of the brackets are in closely spaced substantially parallel relationship. A brace 74 is shown secured at its lower end by a bolt 75 between the spaced parallel ends 73′ of the brackets 73 and at its upper end to the horizontal brace 37 of the base.

Suitable guide means is provided for the foot pedal lever 70 and comprises two vertical parallel spaced members 76, see Fig. 2, bolted at their upper ends to the brace 37 and at their lower ends to the brace 14 between the two vertical legs 12. Suitable means is also provided for holding the foot pedal lever 70 in its inoperative position, as shown in Fig. 4, and comprises a coil spring 77 which is secured at its lower end to a hook 78 on the pedal lever adjacent the connecting pin 69 and at its upper end to a hook 79 which is fastened to one leg 12 of the base.

When using the jig to facilitate assembling the soldering ends on boxes, the operator first places an end piece 8 on the top of the rectangular frame portion of the supporting means 41 and then while holding the open end trough 6 thereon so that the flanges 7 of one end rest on top of the end piece 8, the operator presses down on the foot pedal 71 or pulls down on the handle 67 thereby rotating the spreader arm 55 which moves the gripping bars 48 outwardly whereby the sides of the trough 6 are gripped between the bars 48 and the respective irons 23 and are so held securely in properly assembled relationship on the end piece 8 while the operator proceeds to apply solder to the seams at the edges of the flanges 7. After the soldering operation is complete, the operator removes his foot from the pedal 71 of the lever 70 which thereupon springs up due to the force of the tensioned coil spring 77 returning to its normal position. Simultaneously, the tensioned coil springs 53 draw the gripping bars 48 inwardly and release the sides of the soldered box. The opposite end of the box is soldered in a similar manner.

By providing the improved soldering jig of this invention, the operator is relieved of the duty of holding the parts of the box in proper relationship while soldering the seams and is enabled to give his undivided attention to the soldering operation. As a result, a considerable saving has been achieved in the amount of solder used as well as a reduction in the percentage of defective seams and an increase in the rate of production.

What is claimed is:

1. A soldering fixture for use in soldering ends on trough shaped metal structures comprising a fixed base; a pair of spaced parallel irons fixed to said base having ends overhanging an edge of said base; structure supporting means fixed to said base and extending in spaced relationship between the overhanging ends of said irons, said structure supporting means comprising spaced parallel bars supported by and movable with respect to said supporting means into cooperative engagement with said fixed irons to clamp the marginal portions of said structure between said bars and said irons; and means on said structure supporting means to engage said spaced parallel bars to simultaneously move said bars into cooperative engagement with said irons.

2. A soldering fixture for use in soldering ends on trough shaped metal structures comprising a fixed base; a pair of spaced parallel irons fixed to said base having ends overhanging the edge of said base; structure supporting means comprising a frame fixed to said base; a table on said frame extending in spaced relationship between said irons; spaced parallel bars supported by and movable with respect to said table into cooperative engagment with said fixed irons to clamp the marginal portions of said structure between said bars and said irons; and means rotatably supported on said table constructed and arranged to engage said spaced parallel bars to simultaneously move said bars into cooperative engagement with said irons.

3. A soldering fixture for use in soldering ends on trough shaped metal structures comprising a fixed base; a pair of spaced parallel irons fixed to said base having ends overhanging the edge of said base; structure supporting means comprising a frame fixed to said base; a table on said frame extending in spaced relationship between said irons; spaced parallel bars supported by and movable with respect to said table into cooperative engagement with said fixed irons to clamp the marginal portions of said structure between said bars and said irons; means rotatably supported on said table constructed and arranged to engage said spaced parallel bars to simultaneously move said bars into cooperative engagement with said irons; and a pair of springs connected to said spaced parallel bars, each spring being connected between said bars and at corresponding ends thereof to withdraw said bars in spaced parallel relationship from engagement with said irons.

4. A soldering fixture for use in soldering ends on trough shaped metal structures comprising a fixed base; a pair of spaced parallel irons fixed to said base having ends overhanging the edge of said base; structure supporting means comprising a frame fixed to said base; a table on said frame extending in spaced relationship between said iron; spaced parallel bars supported by and movable with respect to said table outwardly into cooperative engagement with said fixed irons to clamp the marginal portions of said structure between said bars and said irons; elements fixed to said table at opposite ends thereof to limit the inward movement of said bars to simultaneously move said bars outwardly into cooperative engagement with said irons, said bar moving means comprising an arm rotatable in a plane parallel to the plane of said table and having a pair of diagonally disposed rollers, each roller being adapted to engage one of said spaced parallel bars; and a lever for rotating said arm.

5. A soldering fixture for use in soldering ends on trough shaped metal structures comprising a fixed base; a pair of spaced parallel irons fixed to said base having ends overhanging the edge of said base; structure supporting means comprising a frame fixed to said base; a table on said frame extending in spaced relationship between said irons; spaced parallel bars supported by and movable with respect to said table into cooperative engagement with said fixed irons to clamp the marginal portions of said structure between said bars and said irons; means rotatably supported on said table to simultaneously move said bars into cooperative engagement with said irons, said bar moving means comprising an arm rotatable in a plane parallel to the plane of said table and having a pair of diagonally disposed rollers, each roller being adapted to engage one of said spaced parallel bars; means for rotating said arm comprising a foot pedal supported on said base; members on said base to guide the movement of said foot pedal; and a spring secured to said pedal to hold it normally in inoperative position.

HOWARD W. HUBBARD.